United States Patent

[11] 3,624,035

| [72] | Inventor | Hans von Portatius<br>Marl, Germany |
|---|---|---|
| [21] | Appl. No. | 471,702 |
| [22] | Filed | July 13, 1965 |
| [45] | Patented | Nov. 30, 1971 |
| [73] | Assignee | Chemische Werke Huls Aktiengesellschaft<br>Marl, Germany |
| [32] | Priority | July 24, 1964 |
| [33] | | Germany |
| [31] | | P 14 95 369.6 |

[54] POLYETHER-MELAMINES AND PROCESS OF MANUFACTURE
9 Claims, No Drawings

[52] U.S. Cl. .................................................. 260/67.6 R,
260/29.4 R, 260/32.8 N, 260/33.2 R, 260/33.4 R,
260/33.6 R, 260/33.8 R, 260/51.5, 260/839,
260/850

[51] Int. Cl. ............................................... C08g 9/30
[50] Field of Search ............................................ 260/67.6

[56] References Cited
UNITED STATES PATENTS

| 2,085,492 | 6/1937 | Ellis | 260/69 |
|---|---|---|---|
| 2,168,477 | 8/1939 | Hodgins | 260/70 |
| 2,185,167 | 12/1939 | Hodgins | 260/70 |
| 2,187,081 | 1/1940 | Hodgins | 260/70 |
| 2,197,357 | 4/1940 | Widmer et al. | 260/17.3 |
| 2,895,923 | 7/1959 | Kress | 260/2 |
| 3,079,434 | 2/1963 | Christenson et al. | 260/80.73 |
| 3,264,266 | 8/1966 | Merten et al. | 260/73 |

OTHER REFERENCES

Patterson, Modern Plastics, Mar. 1952, Page 164
Walker, Formaldehyde, 3rd edition, June 8, 1964, Pages 32, 44– 45, 78– 81, 84– 85, 96– 97, 136– 137, 264– 268, 382– 384, and 391– 395
Blais, Amino Resins, Pages 8– 12 and 19– 21, 1959

*Primary Examiner*—Howard E. Schain
*Attorney*—Krafft and Wells

ABSTRACT: Polyether-melamine resins produced by the reaction of hemiformals and/or hemiacetals of polyvalent alcohols, possibly in mixtures with monovalent alcohols, with melamine, possibly in mixtures with urea, and in the presence of acid or basic catalyst.

POLYETHER-MELAMINES AND PROCESS OF MANUFACTURE

This application relates to new and improved polyether-melamine resins and the process of manufacture.

It is an object of the present invention to produce new polyether-melamine resins by the reaction of hemiformals with melamine.

It is another object of the present invention to produce new polyether-melamine resins by the reaction of hemacetals with a mixture of melamine and urea.

Further objects of the present invention are to provide polyether resins with new and unexpected advantages over prior art polyether-melamine resins.

Additional objects of the present invention are to provide processes for the manufacture of polyether-melamine and polyether-melamine-urea resins.

The prior art manufacture of melamine resins, melamine-formaldehyde resins and mixed polymers is disclosed in Kirk-Othmer, "Encyclopedia of Chemical Technology," Vol. 1, (1947), in the section entitled "Amine Resins and Plastics," on pp. 741–769, with particular emphasis on melamine, pp. 744–746, melamine-formaldehyde condensates, pp. 749–750, and mixed polymers, p. 751.

According to the prior art production of melamine-formaldehyde resins there is known to be formed, according to the relative amounts of melamine and formaldehyde that are present, first the mono-bis- and tris-methylol compounds and finally the hexamethylol derivative of melamine

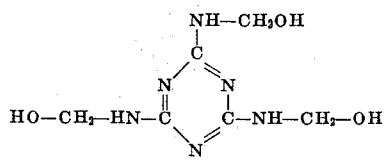

and

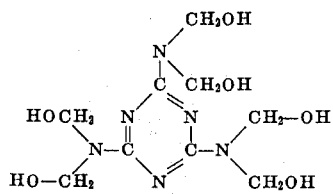

which by liberation of water then forms high molecular weight condensation products, mainly by the formation of methylene bridges

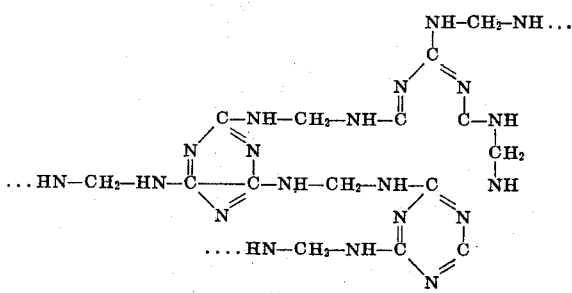

A formation in smaller amounts of methylene ether bridges takes place if a larger proportion of formaldehyde is used than is called for by the 3:1 ratio of formaldehyde:melamine.

It is also known that precondensates of melamine and formaldehyde at a pH between 5 and 6 can be etherified at the boiling point of the alcohol that is used if the liberated water is removed. The ether groups are formed at those N-methylol groups of the melamine which have not taken part in the condensation. These ether groups therefore play only a very minor role in the hardening of the resin by heat and acids so that in order to accomplish such hardening it is necessary to maintain a sufficient concentration of methylol groups for continued condensation.

N-methylol groups take practically no part in the further hardening. This fact is applied in prior art U.S. Pat. No. 2,358,276 where water-soluble polyethers of melamine are obtained, etherifying alkalinically condensed melamine formaldehyde resins with a large excess of glycols, e.g. diethylene glycol. The second hydroxyl group of the glycol apparently does not react with another N-methylol group of another melamine molecule, since no cross-linked products are produced thereby. A serious difficulty with all these etherifications is the continual liberation of substantial amounts of formaldehyde.

According to the present invention polyether-melamines are obtained in a very simple manner by reacting one or more mono- and/or polyvalent hemiformals of polyvalent alcohols, possibly in mixtures with hemiformals of monovalent alcohols, with melamine in the presence of acid or basic catalysts.

Suitable mono- or polyvalent hemiformals of polyvalent alcohols are obtained from a polyvalent alcohol and formaldehyde by processes not found in the prior art, but disclosed in copending applications of the applicant of the present invention filed on the same day as the present application, and entitled "O-Hemiacetals of Formaldehyde and Catalytic Process of Manufacture," Ser. No. 471,744, and and "O-Hemiacetals of Formaldehyde and Process of Manufacture," Ser. No. 471,759. These new hemiformals have the structure HO—$CH_2$—O—R—O—$CH_2$—OH where R is a bivalent alcohol or HO—$CH_2$—O—$R_1$ group in which $R_1$ is a monovalent alcohol group.

According to application Ser. No. 471,744, it has been found that O-hemiacetals of formaldehyde can be obtained in a very simple manner by slowly introducing pure formaldehyde into a possibly substituted and high molecular mono- or polyhydric alcohol while the mixture is cooled in such a manner that the reaction temperature is kept at least 20° C. and preferably 50° to 110° C. above the boiling point of the pure formaldehyde and the concentration of the free formaldehyde during the reaction does not exceed 8 percent, preferably not 5 percent.

A suitable pure formaldehyde must not contain more than 0.002 percent water and must be sufficiently free from impurities such as formic acid that it will not polymerize.

The formaldehyde, which can be diluted with an inert gas such as nitrogen, is kept above the boiling point of the monomeric formaldehyde (−21° C.) while being introduced in the gaseous condition into the alcohol.

It is especially surprising that by the method of application Ser. No. 471,744 hydroxyl groups can be converted by formaldehyde into hemiformals which in high molecular weight compounds are either at the end of the molecule, or preferably on side chains, without the production of any cross-linking, and where the hydroxyl group can be either primary, secondary or tertiary. For this purpose the high molecular weight compounds must be either liquid at room temperature, or must be soluble in inert solvents such as benzene, toluene, chloroform, carbon tetrachloride, cyclohexane, dimethyl-sulfoxide or cyclical acetals such as 1,3-dioxalane or its homologues. High molecular weight compounds suitable for reacting with formaldehyde while dissolved in the above solvents are polyesters, preferably condensates of divalent acids with trimethylol-propane, glycerol, polyether, polythioether, polycarbonates, saponified copolymers of vinyl acetate with vinyl chloride, styrene, butadiene, vinylidene chloride, acrylic esters, methacrylic esters and acrylic nitrile, maleic anhydride, etc. Hydrogenated ketone-formaldehyde resins are also eminently suitable, as well as copolymers which can have glycidol, endomethylene- tetrahydrobenzyl alcohol or allyl alcohol as their alcoholic component. The hydroxyl content can vary widely, from 0.001 to 80 percent, preferably from 0.05 to 50 percent, without the occurrence of cross-linking or the formation of complete cyclic acetals.

It has been found advantageous to perform the formaldehyde-alcohol reaction between 0° and 140° C., preferably between 30° and 130° C., but especially between 40° and 100° C. Under normal conditions solid alcohols and phenols are preferably used in their liquid phase if their melting points are not higher than about 110° C., and their viscosity in melted condition is not too high to permit vigorous stirring during the addition of the monomeric formaldehyde. Higher melting compounds are preferably dissolved in one of the above-mentioned solvents which will dissolve the alcohol in higher concentrations, and the formaldehyde is then permitted to react with alcohol at lower temperatures.

The formation of O-hemiformals generally occurs with only moderate speed, and is especially slow at temperatures below 0° C. where higher local formaldehyde concentrations will be formed which will cause undesired side reactions such as the addition of another formaldehyde molecule to an already present hemiformal molecule so as to produce the known poly-hemiformal mixtures mixed with free alcohol. At lower temperatures there may also be the formation of considerable paraformaldehyde which will separate out. Too high local concentrations of formaldehyde can also result from too rapid an addition of monomeric formaldehyde. For this reason the formaldehyde is added slowly and in only such amounts as will react promptly, while the mixture is being vigorously stirred to insure uniform distribution of the aldehyde. It is best to keep the entire system under a partial vacuum whereby local concentrations of formaldehyde will be kept below 1 percent. The same result is produced by increasing the reaction temperature. By increasing the partial vapor pressure of the formaldehyde with the temperature (at 40° C. about 5 atm.), the solubility of the free formaldehyde in the corresponding alcohol will at the same time be diminished, so that the only remaining formaldehyde will be that which is combined as a hemiformal. In a few cases, e.g. in the conversion of glycerol or cyclohexane-dimethanol, the reaction with formaldehyde does not occur until a temperature above 80° C. is reached, namely in cases where the individual hydroxyl groups are screened off too much by hydrogen bonds. The introduction of the monomeric formaldehyde is rapid enough to produce in each case a quantitative conversion.

During the hemiformal formation large quantities of heat are liberated and removed by effective cooling, such as water bath circulation.

The O-hemiformals obtained are stable, water-clear, limpid to viscous liquids, miscible with alcohols such as methanol, ethanol, propanol, etc., with aromatics such as benzene and toluene, with ethers such as diethyl ether and with halogenated hydrocarbons such as chloroform, carbon tetrachloride, trichlorethylene and methylene chloride. If the diol component is miscible with water, then the corresponding O-hemiformals are also soluble in water.

Under the reaction conditions of the process disclosed in application Ser. No. 471,759, catalysts will greatly accelerate the formation of hemiformals and in some cases will make their production possible.

Suitable catalysts which can be used in amounts of 0.00001 percent to 2 percent relative to the weight of the added alcohol are especially the tertiary, secondary and primary amines such as triethylamine, tri-n-butylamine, pyridine, piperidine, diethylamine, cyclohexyl-methylamine, butylamine, N-methyl-aniline, cyclohexylamine, isoamylamine and tri-n-octylamine, phosphines such as triphenylphosphine and tri-n-butyl-phosphine, stibines such as tri-n-butyl-stibine, arsines such as tri-n-butylarsine, and quarternary ammonium compounds such as tetramethyl ammonium bromide.

The catalyst is preferably introduced into the alcohol, whereupon the formaldehyde is added. The reaction, which occurs with the liberation of heat and which therefore requires effective cooling, succeeds especially well if the formaldehyde is introduced in gaseous form. In reactions which are performed at temperatures below the boiling point of monomeric formaldehyde (−21° C.), the formaldehyde is introduced in liquid form, only at the rate at which it is used up. With the greatly increased reaction velocity resulting from the use of a catalyst, it is now possible in technical processes to introduce the formaldehyde at a rate which would ordinarily be difficult or impossible without danger of producing undesired sideproducts such as paraformaldehyde.

For the same reason, it is advantageous to quickly disperse the introduced formaldehyde by rapid stirring.

The reaction is advantageously performed at temperatures between −100° and +150° C., preferably between −20° and +130° C., and best at 30° C.

Especially pure O-hemiacetals are obtained if a pure waterfree formaldehyde is introduced which is sufficiently free from ionized impurities not to polymerize.

The formaldehyde can, if desired, be diluted with an inert gas such as nitrogen, argon, neon, xenon and krypton.

The new pure and modified polyether-melamines of the present invention are especially suitable for the production of casting resins, moldable masses, lacquers and adhesives. Because of their splendid compatibility with known plastics and molding substances, e.g. with the usual melamine-, urea- and phenol-resins, they are also well adapted to be modified. They are used successfully for paper coating and textile impregnation.

Suitable bivalent alcohols are glycol, propylene-glycol-1,2, propylene-glycol-1,3, butane-diol-1,3, butane-diol-1,4 pentane-diol-1,5, 2,2-dimethyl-propane-diol-1,3,2,2-di-methyl-propane-diol-(1,3), hexane-diol-(1,6, decane-diol-(1,10), diethylene-glycol, thio-diglycol, diethanolamine, thiodiglycol-sulfoxide, 3-amino-2,5-dimethyl-hexane-diol-(2,5), 3,5-bis(oxyisopropyl)-pyridine, hexadiene-(2,4)-diol-(1,6), butene-diol-(1,4) and other diols in which the carbon chain has a double or a triple bond.

Other suitable diols are cyclohexane diol-(1,4), 2,5- or 2,6-norbornene-diol, 2,2,4,4-tetramethyl-1,3-cyclo-butane-diol, cis-, trans- and 1:1 cis-trans mixtures of 2,2,4,4-tetramethyl-1,3-cyclohexane-dimethanol-1,4, also diols of the structure

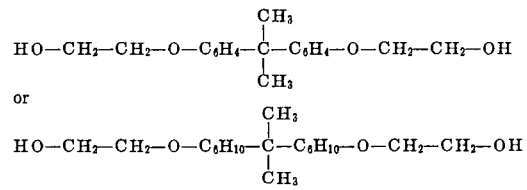

Divalent phenols are also suitable, e.g. pyrocatechol, resorcinol, hydroquinone and p,p'-dioxydiphenyl-dimethylmethane.

Use also can be made of polyols of higher valence, e.g. glycerol, hexane-triol, dioxy-acetone, pentaerythrite and polyvinyl alcohol, triethanolamine, pyrogallol and oxyhydroquinone.

The new polyether-melamines can be readily obtained by heating melamine with the polyvalent hemiformal with addition of a little acid whereby the melamine goes into solution before polycondensation commences. At temperatures below 90° C., precondensates will generally be formed which will harden at temperatures above 100° C.

Suitable temperatures for the precondensation are generally between 30° and 95° C., preferably in the range from 60° to 90° C., but also below 60° C., e.g. at 40° C. the reaction will occur, although slowly.

Suitable catalysts are e.g. conc. sulfuric acid, perchloric acid, hydrochloric acid, hydrobromic acid, p-toluene-sulfonic acid, Lewis acids such as boron fluoride, boron-fluoride-etherate, stannic chloride, ferric chloride and oxonium-fluoborate, and also acid salts of polybasic acids such as potassium hydrogen sulfate, sodium dihydrogen phosphate and potassium hydrogen sulfate.

Especially suitable catalysts are substances which give off protons only by thermal decomposition after higher temperatures are reached where thermal hardening is not desired at lower temperatures. Such substances are found among the acid salts of ammonia, e.g. ammonium chloride, ammonium hydrogen sulfate and the diazonium fluoborates, e.g. benzene-diazonium-fluoborate, p-nitrophenyl-diazonium-fluoborate and butadiene-sulfone.

The acid catalysts are used in amounts of from 0.0001 percent to 5 percent, preferably 0.01 percent to 3 percent, relative to the weight of melamine. The choice of catalysts is based on whether a rapid or a slow condensation process is preferred. Thus the condensation process with concentrated sulfuric acid, perchloric acid or boron-trifluoride-etherate is exceptionally fast, whereas with p-toluene-sulfonic acid it is much more moderate.

It is also possible to perform the precondensation in an alkaline medium and then the final hardening in an acid medium. As alkaline catalysts, use can be made of alkali hydroxides such as lithium, sodium or potassium hydroxide in the form of finely divided solids or as aqueous or alcoholic solutions, although calcium oxide, barium oxide, sodium carbonate, potassium carbonate, magnesium carbonate and the like are also used. Since the condensation is generally performed in the absence of water, metal alcoholates such as sodium methylate, potassium ethylate and aluminum isopropylate are especially suitable.

The basic catalysts are used in amounts of from 0.001 percent to 5 percent relative to the melamine.

The use of basic catalysts has the advantage of reacting the bis-hemiformals at a stage in which most of them are in a free state, in a medium in which they are naturally stable.

It is generally also possible to produce precondensates without any catalyst, but higher temperatures between 110° and 130° C. must then be used and more time will be required for the condensation than when catalysts are used.

The reaction is preferably performed by bringing both components and the catalyst together and then warming the mixture until a single precondensate is formed. The single precondensate is recognized by the mixture becoming entirely homogeneous. The hardening can obviously be hastened by the application of more heat. For the production of a uniform precondensate, it is advantageous to keep the mixture well agitated. The condensation is generally performed in the presence of air, whereby colorless products are always obtained. If, however, the hemiformal component contains a structure which is auto-oxidizable, especially at higher temperatures, like a nitrogenous group, then the work is preferably done in an inert atmosphere such as nitrogen.

It is also possible to work with solutions. Condensation in solution is especially advantageous for plastic pastes produced for coating paper or impregnating fabrics, or for making thin lacquers from precondensates which are viscous at ordinary temperatures. Suitable for use as solvents are all substances which will readily dissolve at least one of the components to bring it into intimate contact with the other substances present. Possible for use as solvents are water, alcohols, alcohol-water mixtures, dimethyl-formamide, dimethyl-sulfoxide, benzene and cyclic formals such as dioxolane-1,3 dioxepane-1,3 or diethylene-glycol-formal. The addition of water is limited by the fact that more than 35 percent relative to the mass of the reactants, would cause dissociation of the hemiformal into its alcoholic and formaldehyde hydrate components which would then produce formaldehyde-melamine resin in the conventional manner with only a limited amount of polyether structure.

This new process permits the properties of the polyether-melamines to be varied within wide limits by suitable selection and proportioning of the diol or polyol components and choice of the hemiformal:melamine ratio. If, for example, hemiformals are chosen which have only a relatively small proportion of paraffinic hydrocarbon such as glycol, then a very hard and rather brittle product will be formed, and the same is also true of an aromatic or bulky cycloaliphatic formals. Hemiformals with relatively large proportions of paraffinic hydrocarbons such as hexylene-glycol-(1,6)-bis-hemiformal or polyethylene-oxide-($\alpha\omega$)-bis-hemiformal, on the contrary, give soft, elastic materials, so that with the molar ratio of 3:2 it is possible by the choice of hemiformal components to arrive at the desired hardness and elasticity. For hemiformals with other properties, it is necessary, in order to maintain equimolar ratios between poly-hemiformals and melamine, to choose other ratios, e.g. of glycerol-tris-hemiformal to melamine.

It is also possible, however, with a given hemiformal, by varying the molar ratio of e.g. bis-hemiformal to melamine from 0.5 to 8 to 8.0 to 0.5, to vary the hardness and the elasticity. For example, with a molar ratio of bis-hemiformal to melamine of 6:2, the hemiformal groups will no longer all react with melamine. The "superfluous" hemiformal groups will in part become cross-linked with the liberation of water to form complete acetal bridge with the production of clear, soft and at the same time elastic substances.

Another possible method of varying the properties of the products consists of simultaneous condensation of two or more bis- or poly-hemiformals with melamine in widely varying proportions, depending only on the properties that are desired. If a potentially hard hemiformal is combined with a potentially soft hemiformal, then the product will be a hard but elastic material.

If instead of the bis-hemiformal, tris- and higher functioning formals are used, then their ratio to the melamine would correspond to the 3:2 ratio of bis-hemiformal to melamine. The products are opaque pastes when obtained by quickly heating the components (10 to 30 minutes) to temperatures between 70° and 95° C. They are generally miscible in all proportions in polar solvents such as water, alcohols, dimethyl-formamide, etc.

When the components are heated a long time in the presence of alkaline catalyst to the above or higher temperatures, the precondensates become increasingly more waxlike to solid so that in contrast to the condensates of urea and melamine, completely hardened products are obtained even at temperatures between 120° and 160° C. The hardened products are insoluble in the usual organic solvents such as benzene, acetone, alcohols and chlorinated hydrocarbons.

The waxlike to solid precondensates are filled into molds either by themselves or mixed with fillers such as cellulose, wood flour or powdered stone, and then hardened in the moulds by heating with acid catalysts.

The polyether content is greatly increased by condensing bis- or poly-hemiformals with melamine in mixtures with monohemiformals. Suitable monohemiformals can be derived e.g. from methanol, ethanol, n-propanol, isopropanol, n-butanol, isobutyl alcohol, n-amyl alcohol, isoamyl alcohol, n-hexyl alcohol, n-heptanol, n-octanol, n-decyl alcohol, lauryl alcohol, myristyl alcohol, benzyl alcohol, cyclohexanol, diethylene-glycol-monoethyl ether, triethylene-glycol-monobethyl ether, triethylene-ether, phenol, o-, m-, and p-cresol, o-, m-, and p-chlorphenol, p-bromphenol, o-, m-, and p-nitrophenol, guaiacol, cyclohexanol, eugenol, saligenin, o-, m-, and p-oxyaceto-phenone, salicylaldehyde and o-cyclohexyl-phenol.

Mono-hemiformals which are suitable as modifiers are the monohemiformals of polyvalent alcohols, e.g. glycol-monohemiformal, propane-diol-(1,3)-monohemiformal, butane-diol-(1,3)-monohemiformal, glycerol-monohemiformal, cyclohexane-dimethanol-(1,4)-monohemiformal and resorcin-monohemiformal. These substances are suitable for use in pure form and also in mixtures as when a polyvalent alcohol is reacted with less formaldehyde then would be functionally equivalent to the alcohol, e.g. 1 mole glycol with 1 mole formaldehyde.

In every case the products will be polyether-ureas which will exhibit a higher degree of etherification with less precondensation and which will also have free alcohol groups.

The precondensates of these resins are especially valuable because they are exceptionally soluble in chlorinated hydrocarbons, ethers and ketones to form solutions which can be hardened as lacquers and which are strongly adherent because of the presence of polar hydroxyl groups. They are also very compatible with alkyd resins.

It has also been found that it is possible to produce mixed polyetherurea-melamines by substituting a portion of the melamine by urea or thiourea. In this manner it is possible to advantageously combine the properties of the polyether ureas with those of the polyether melamines, especially when less cross-linked and therefore softer products are desired. The proportions of urea can vary widely, from about 5 to 95 percent by weight, relative to the melamine. The method of preparation is the same as that described above.

The specific examples of application Ser. No. 471,744 disclose the preparation of the hemiformals of propanol, n-butanol. 2-ethylhexanol, laurylalcohol. cyclohexanol, sec-butanol, allylalcohol, propyleneglycol monoacrylate, endomethylene-tetrahydrol-benzyl-alcohol, phenol, glycidol propargyl alcohol, glycol, butanediol-1,4,diethyleneglycol, thiodiglycol, glycerol, trimethylolpropane, triethanolamine and butene-2-diol-1,4.

Application Ser. No. 471,759 discloses in the specific examples the preparation of the hemiformals of n-propanol, cyclohexanol, lauryl alcohol, sec-butanol, 2-ethyl-hexanediol-1,3, propylene-glycol-mono-acrylate, butane-diol-1,4, glycerol, cyclohexane-dimethanol, butane and resorcin.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In a beaker equipped with stirrer, thermometer and external heater, 30.5 parts glycol-bis-hemiformal are thoroughly mixed with 21.1 parts melamine and 0.1 part p-toluene-sulfonic acid and slowly warmed during 30 minutes to 85° C. With further increase of temperature the mixture becomes more viscous and solidifies at 120° C. After further heating to 140° C. (15 minutes), a glassy brittle block is obtained which consists of polyether-melamine. The substance is insoluble in water and in all organic solvents.

EXAMPLE 2

In a beaker equipped with stirrer, thermometer and external heater, 30.5 parts glycol-bis-hemiformal are thoroughly mixed with 21.1 parts melamine and 0.1 part powdered solid caustic alkali and warmed slowly within 30 minutes from 30° C. to 85° C. whereby a viscous mass is formed, which by further heating to 90° C. is solidified. The hardening commences after 15 minutes of heating to 130° C. A white block is obtained which consists of polyether-melamine.

EXAMPLE 3

In the apparatus as set up in example 1, 21.1 parts melamine are slowly heated with 51.1 parts glycol-bis-hemiformal and 0.01 part p-toluene-sulfonic acid. At 75° C. a clear solution is formed which solidifies upon being heated to above 110° C. It hardens in 10 minutes at 130° C. A solid white body is obtained, which is softer than the product of example 1.

EXAMPLE 4

In the experimental apparatus described in example 1, 21.1 parts melamine are comminuted in a mortar with 0.02 parts concentrated sulfuric acid and to this mixture 35.05 parts butane-diol-(1,4)-bisformal are added. Upon heating to 40° C. an exothermal condensation commences while the temperature goes up to 100° C. After being hardened 15 minutes at 140° C., an elastic colorless and relatively soft substance is obtained which consists of the polyether-melamine of butane-diol-(1,4)-bisformal.

EXAMPLE 5

In the experimental apparatus described in example 1, 21.1 parts melamine, 45.6 parts thiodiglycol-bis-hemiformal and 0.05 parts p-toluene-sulfonic acid are thoroughly mixed and heated to 90° C. within 1.5 hours. There is first formed a viscous mass which solidifies when the temperature reaches 90° C. The hardening occurs in one hour by heating to 140° C. A very hard block is obtained which has a pure white color and which cannot be scratched with a knife.

EXAMPLE 6

In the experimental apparatus described in example 1, 31.6 parts melamine are thoroughly mixed with 45.5 parts glycerol-tris-hemiformal and 0.1 part p-toluene-sulfonic acid and heated to 100° C. within 1 hour. A solid body is formed, which is hardened at 140° C. A white and relatively brittle solid is obtained consisting of polyether-melamine.

EXAMPLE 7

In the experimental apparatus described in example 1, 21.1 parts melamine, 7.5 parts urea and 30.5 parts glycol-bis-hemiformal together with 0.1 parts p-toluene-sulfonic acid are first warmed 80 minutes to 50° C. to form the precondensate which solidifies upon further heating to 80° C. and is hardened at 110° C. The product is an opaque white substance consisting of polyether-melamine-urea.

EXAMPLE 8

In a 3-necked flask equipped with stirrer, thermometer and nitrogen inlet and outlet, 31.6 parts melamine together with 59.8 parts triethanolamine-tris-hemiacetal and 0.2 parts p-toluene-sulfonic acid are heated within 60 minutes to 120° C. under a current of nitrogen whereby a solid block is obtained which is hardened within 10 minutes by heating to 140° C. A glassy and very hard body is produced which is colorless.

EXAMPLE 9

In the experimental apparatus of example 1, 51 parts cyclohexane-dimethanol-(1,4)-bis-hemiformal together with 21.1 parts melamine and 0.05 parts p-toluene-sulfonic acid are heated 25 minutes to 40° C., 40 minutes to 80° C., and 30 minutes to 120° C. A white, tenacious and somewhat viscous substance is obtained.

EXAMPLE 10

In the experimental apparatus of example 1, 22.9 parts glycol-bis-hemiformal, 6.5 parts butanol-hemiformal and 12.6 parts melamine together with 0.1 part p-toluene-sulfonic acid are heated 1 hour to 80° C. to form the precondensate, which upon further heating to 100° C. solidifies and is hardened within 6 minutes by heating to 140° C. The product is a white solid block.

EXAMPLE 11

In the experimental apparatus of example 1, 15.3 parts glycol-bis-hemiformal, 20.8 parts diglycol-bis-hemiformal, 21.1 parts melamine and 0.08 parts p-toluene-sulfonic acid are thoroughly mixed and then kept 90 minutes at 50° C. to form the precondensate. Within another half hour it is heated to 100° C. to produce cross-linking. It is hardened inside of 10 minutes at 140° C. A colorless polyether-melamine with a high ether content is obtained.

EXAMPLE 12

In the experimental apparatus of claim 1, 70.1 parts butane-diol-(1,4)-bis-hemiformal, 10.5 parts melamine, 22.5 parts urea and 0.05 parts 70 percent perchloric acid are thoroughly mixed and slowly heated. At 40° C. a strongly exothermic reaction commences which brings the temperature of the mixture up to 90° C. and at the same time causes solidification. Heating 5 minutes to 130° C. causes hardening. The product is a clear, tenacious soft mass.

EXAMPLE 13

In the experimental apparatus of example 1, 115 parts polyethylene-glycol-bis-hemiformal (MG 660), 21.1 parts melamine and 0.1 part. conc. sulfuric acid are thoroughly mixed and within 35 minutes heated to 95° C. After being kept at this temperature another 15 minutes, a clear solution of the precondensate is obtained which upon being heated to 120°–130° C. hardens within 20 minutes to a solid, elastic, opaque and colorless body.

EXAMPLE 14

In the experimental apparatus of example 1, 42.5 parts resorcinol-bis-hemiformal, 21.1 parts melamine and 0.01 parts conc. sulfuric acid are thoroughly triturated and slowly heated. At 35° C. a strongly exothermic condensation reaction commences, bringing the temperature up to 120° C. within 5 minutes and producing a yellow, very hard and brittle resin consisting of polyether-melamine.

EXAMPLES 15–17

In the experimental apparatus of example 1, the bis- or polyhemiformal components disclosed in table I together with melamine and the catalyst are thoroughly mixed and then condensed at the temperatures and during the times specified in table I. Hardenable precondensates are produced.

EXAMPLES 18–20

The precondensates produced in examples 15–17 are stirred with conc. sulfuric acid under the conditions specified in table 2, and filled into a tube closed at one end. Heat is then applied at a sufficient rate from the outside to cause the temperature range of 50° to 130° C. to be steadily traversed within 40 to 65 minutes. Hard colorless solid bodies in the form of round bars are produced. They are insoluble in the usual solvents such as water, alcohols, ketones, gasoline, benzene and chlorinated hydrocarbons.

EXAMPLES 21–23

In the experimental apparatus of example 1, the hemiformal components are thoroughly mixed with melamine, solvent and catalyst and condensed in the usual manner under the conditions mentioned in table 3.

The products after hardening consist of glasslike resins. The precondensates formed at 70° C. can also be coated on sheet metal on which they will form thin films which can then be hardened. Very hard and insoluble coatings are thus obtained.

EXAMPLES 24–27

In the experimental apparatus of example 1, monohemiformals of polyvalent alcohols are condensed with melamine alone or in admixture with bis-hemiformals according to the instructions of table 4. Solid resins partly opaque, partly translucent, are produced.

TABLE 1.—PRODUCTION OF PRECONDENSATES OF BIS- AND TRIS- HEMIFORMALS WITH MELAMINE IN THE PRESENCE OF BASIC CATALYSTS

| No. | Bis- or poly-hemiformal components, parts | Melamine, parts | Catalyst, parts | Condensation Temperature, ° C. | Time minutes | Condition of the precondensate |
|---|---|---|---|---|---|---|
| 15 | 41.6 diglycol-bis-hemiformal | 21.1 | 0.05 NaOH | 75 | 30 | Clear, viscous liquid. |
| 16 | 45.6 thiodiglycol-bis-hemiformal | 21.1 | 0.1 KOH | 75 | 40 | Do. |
| 17 | 56.3 trimethylol-propane-tris-hemiformal | 31.6 | 0.08 NaOH | 40–70 | 60 | Pastelike. |

TABLE 2.—HARDENING OF PRECONDENSATES OF BIS- OR TRIS-HEMIFORMALS WITH MELAMINE IN THE PRESENCE OF ACID CATALYSTS

| No. | Precondensate consisting of— | Catalyst for the hardening | Hardening temperature, ° C. | Hardening time, minutes | Comments |
|---|---|---|---|---|---|
| 18 | 41.6 parts diglycol-bis-hemiformal / 21.1 parts melamine | 0.1 part conc. H$_2$SO$_4$ | 70–120 | 40 | Solidifies at 80° C., white. |
| 19 | 45.6 parts thiodiglycol-bis-hemiformal / 21.1 parts melamine | do | 60–110 | 45 | Solidifies at 70° C., white. |
| 20 | 56.3 parts trimethylol propane / 31.6 parts melamine | 0.05 part conc. H$_2$SO$_4$ | 50–130 | 65 | Solidifies at 85° C., white. |

TABLE 3.—PRODUCTION OF POLYETHER-MELAMINES IN SOLUTION

| No. | Melamine, parts | Catalyst, conc. H$_2$SO$_4$, parts | Condensation Temp., ° C. | Time, min. | Comments | Solvent, parts |
|---|---|---|---|---|---|---|
| Bis-hemiformal components: 30.6 parts glycol-bis-hemiformal | | | | | | |
| 21 | 21.1 | 0.05 | 40–120 | 100 | At 70° C. a clear, viscous solution, solid and glass-like after hardening. | 10 water. |
| 22 | 21.1 | 0.05 | 40–80 | 55 | Clear, very viscous resin | 15 ethyl alcohol, 8 water. |
| Bis-hemiformal components: Cyclohexane-dimethanol-(1,4)-bis-hemiformal | | | | | | |
| 23 | 21.1 | 0.05 | 40–120 | 90 | At 70° C. a viscous solution, solid white resin after hardening | 20 n-butanol. |

TABLE 4.—POLYCONDENSATION OF MONO-HEMIFORMALS OF POLYVALENT ALCOHOLS WITH MELAMINE ALONE OR IN ADMIXTURE WITH BIS-HEMIFORMALS

| No. | Melamine, parts | Catalyst, parts | Mono-hemiformal components, parts | Bis-hemiformal components, parts | Condensation temp., ° C. | Time, min. |
|---|---|---|---|---|---|---|
| 24 | 31.6 | 0.05 NaOH | 23 glycol-mono-hemiformal | | 40–120 | 120 |
| 25 | 15.8 | 0.1 conc. H$_2$SO$_4$ | 11.5 glycol-mono-hemiformal | 22.8 glycerol-bis-hemiformal | 40–130 | 130 |
| 26 | 31.6 | 0.05 70% HClO$_4$ | 18.7 butane-diol-(1,4)-mono-hemiformal | 22.8 thiodiglycol-bis-hemiacetal | 50–130 | 115 |
| 27 | 31.6 | 0.1 conc. H$_2$SO$_4$ | 43.3 cyclohexane-dimethanol-(1,4)-mono-hemiformal | | 50–135 | 120 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A polyether-melamine process consisting essentially of:
   a. reacting melamine with
   b. a hemiformal selected from the group consisting of monovalent hemiformals of polyvalent alcohols, polyvalent hemiformals of polyvalent alcohols, polyvalent hemiformals of polyvalent alcohols, mixtures of monovalent hemiformals of polyvalent alcohols with hemiformals of monovalent alcohols, mixtures of polyvalent hemiformals of polyvalent alcohols with hemiformals of monovalent alcohols, and mixtures thereof in the presence of
   c. a catalyst selected from the group consisting of acids and bases.

2. A polyether-melamine process consisting essentially of:
   a. reacting a mixture of melamine and 5 to 95 percent by weight urea relative to said melamine with
   b. a hemiformal selected from the group consisting of monovalent hemiformals of polyvalent alcohols, polyvalent hemiformals of polyvalent alcohols, mixtures of monovalent hemiformals of polyvalent alcohols with hemiformals of monovalent alcohols, mixtures of polyvalent hemiformals of polyvalent alcohols with hemiformals of monovalent alcohols, and mixtures thereof in the presence of
   c. a catalyst selected from the group consisting of acids and bases.

3. The process of claim 1, wherein the reaction takes place at a temperature between 30° and 95° C.

4. The process of claim 1, wherein the reaction takes place at a temperature between 60° and 90° C.

5. The process of claim 1, wherein the catalyst of (c) is an acid having a concentration of 0.0001 to 5 percent relative to the weight of melamine.

6. The process of claim 1, wherein the catalyst of (c) is an acid having a concentration of 0.01 to 3 percent relative to the weight of melamine.

7. The process of claim 1, wherein the catalyst of (c) is a base having a concentration of 0.0001 to 5 percent relative to the weight of melamine.

8. The process of claim 1, wherein the molar ratio of (b) to (a) is approximately 0.5:8 to 8.0:0.5.

9. A polyether-melamine resin condensation product consisting essentially of melamine, butane-diol-(1,4)-monohemiformal and thiodiglycol-bis-hemiformal.

* * * * *